United States Patent
Huang et al.

(10) Patent No.: US 12,253,146 B1
(45) Date of Patent: Mar. 18, 2025

(54) TRANSMISSION DEVICE

(71) Applicant: Point Robotics Medtech Inc., Hsinchu County (TW)

(72) Inventors: Kun-Pin Huang, Hsinchu County (TW); Cheng-Chung Huang, New Taipei (TW)

(73) Assignee: Point Robotics Medtech Inc., Hsinchu County (TW)

( * ) Notice: Subject to any disclaimer, the term of this patent is extended or adjusted under 35 U.S.C. 154(b) by 0 days.

(21) Appl. No.: 18/429,317

(22) Filed: Jan. 31, 2024

(30) Foreign Application Priority Data

Sep. 14, 2023 (TW) ................................ 112134983

(51) Int. Cl.
*F16H 37/12* (2006.01)
(52) U.S. Cl.
CPC .................................. *F16H 37/124* (2013.01)
(58) Field of Classification Search
CPC ................................................... F16H 37/124
See application file for complete search history.

(56) References Cited

U.S. PATENT DOCUMENTS

2022/0209404 A1* 6/2022 Zou .................... F16H 19/04

* cited by examiner

Primary Examiner — Terence Boes
(74) Attorney, Agent, or Firm — Li & Cai Intellectual Property Office

(57) ABSTRACT

A transmission device includes a base body and a plurality of driving modules disposed in the base body. Each driving module includes a first transmission set, a linking member, a second transmission set, a third transmission set, a gear set, and a driving motor. The first transmission set includes a slide rail and a slide block. The slide block is fixed on the base body. The linking member is fixed on the slide rail and has a slide shaft. The second transmission set includes a screw rod and a nut, and the nut is fixed on the slide rail. The third transmission set includes a worm rod and a worm gear meshed with the worm rod. The gear set is connected to the worm rod. The driving motor has a driving shaft connected to the gear set.

12 Claims, 9 Drawing Sheets

TRANSMISSION DEVICE

CROSS-REFERENCE TO RELATED PATENT APPLICATION

This application claims the benefit of priority to Taiwan Patent Application No. 112134983, filed on Sep. 14, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a transmission device, and more particularly to a transmission device capable of reducing assembly errors and improving accuracy.

BACKGROUND OF THE DISCLOSURE

Generally, in order to be used in highly complex medical surgeries, medical apparatuses, such as a surgical tool, must have characteristics including high precision, high stability, high sensitivity etc. To meet these requirements, mechanical components within the surgical tool need to be assembled with less assembly errors and enhanced assembly rigidity.

For example, a transmission mechanism of the surgical tool includes a lead screw rod, a coupling, and a driving motor. During assembly, the lead screw rod, the coupling, and the driving motor are arranged along the same axis. A torque output by the driving motor is transmitted to the lead screw rod through the coupling, and then the target component (such as a robotic arm of the surgical tool) is driven by the lead screw rod to produce a displacement. However, the precision of the transmission mechanism can be easily affected by assembly errors which result from assembling of the coupling and other components connected to the coupling.

In addition, as for an existing surgical tool, such as an electric drill, the displacement of the drill bit is generally calculated by using an encoder to measure the rotation number of the driving motor in the electric drill. However, due to influence of assembly quality of the components, as well as gap tolerance of the components, the displacement calculated by using the encoder is not accurate enough.

SUMMARY OF THE DISCLOSURE

In response to the above-referenced technical inadequacy, the present disclosure provides a transmission device to resolve the problem that precision of the transmission mechanism in the surgical tool is easily affected by assembly quality and tolerance of components.

In order to solve the above-mentioned problems, one of the technical aspects adopted by the present disclosure is to provide a transmission device. The transmission device includes a base body and a plurality of driving modules. The plurality of driving modules is disposed in the base body. Each of the driving modules includes a first transmission set, a linking member, a second transmission set, a third transmission set, a gear set, and a driving motor. The first transmission set includes a slide rail and a slide block movably disposed on the slide rail. The slide block is fixed on an inner surface of the base body, such that the slide rail reciprocates along a straight line relative to the slide block. The linking member is fixed on the slide rail. The linking member includes a slide shaft. The second transmission set includes a screw rod and a nut movably disposed on the screw rod. The nut is fixed on the slide rail. The third transmission set includes a worm rod and a worm gear that mesh with each other. The worm gear is connected to one end of the screw rod. The gear set is connected to the worm rod. The driving motor includes a driving shaft. The driving shaft is connected to the gear set. The driving shaft extends along a first direction. The driving motor is used to provide power to drive the driving shaft, the driving shaft drives the gear set, the third transmission set, the second transmission set, and the first transmission set, such that the slide shaft moves along a second direction. The first direction is perpendicular to the second direction.

Therefore, in the transmission device provided by the present disclosure, through the arrangement of the first transmission set, the second transmission set, the third transmission set, and the gear set, torque output by the driving motor can be transmitted to the slide shaft. During assembling, the driving motor, the transmission sets, and the slide shaft do not need to be arranged on the same axis, which is a relatively simple way of assembly. The effect of assembly errors resulted from assembling of the components can be reduced, thereby improving precision. In addition, the driving modules are disposed in the base body, the overall rigidity of the transmission device is thus enhanced, and the stability of the transmission device during operation is improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Embodiment

Figure 1:
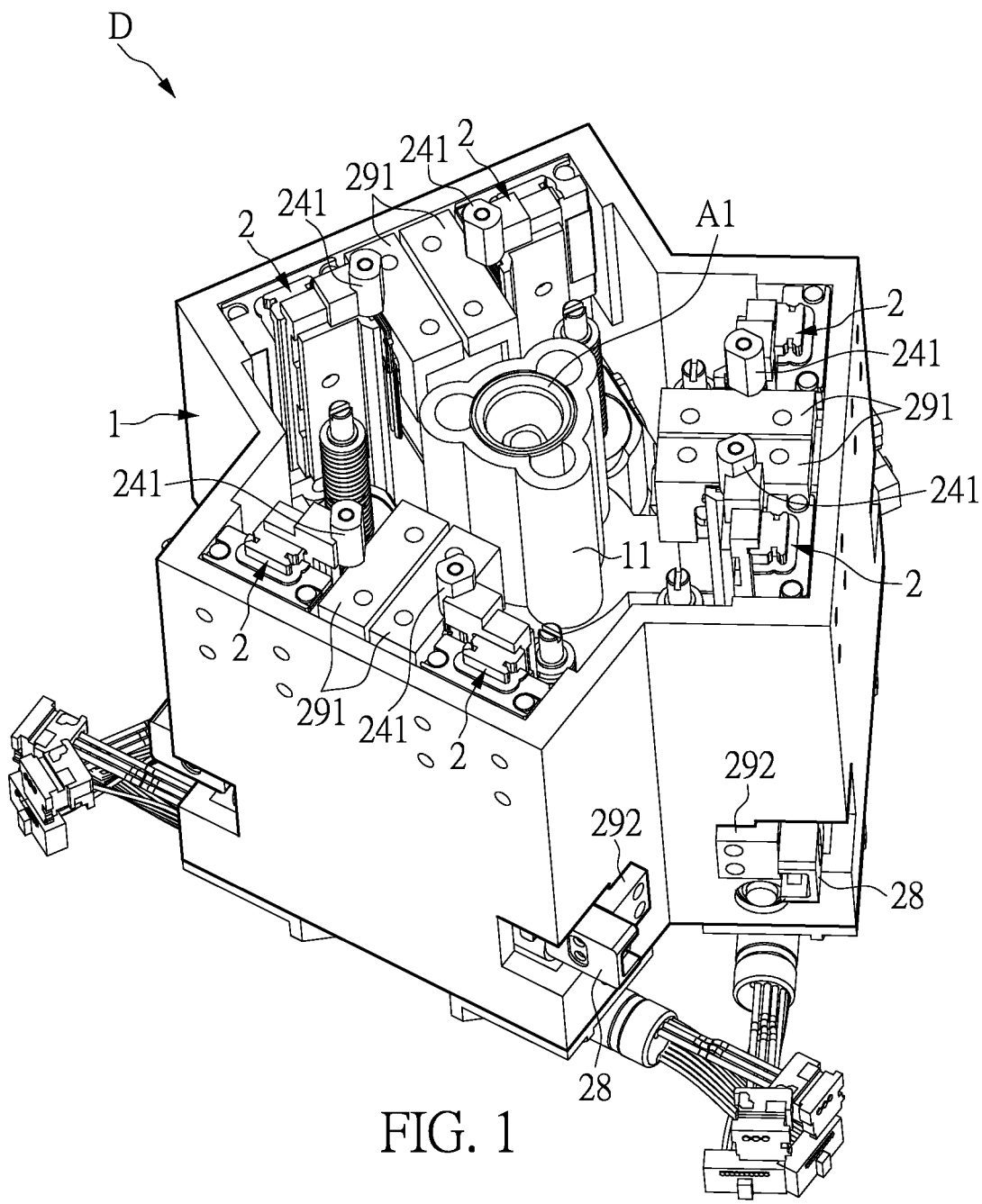
FIG. 1 schematically illustrates a first perspective view of a transmission device according to the present disclosure.
Figure 2:
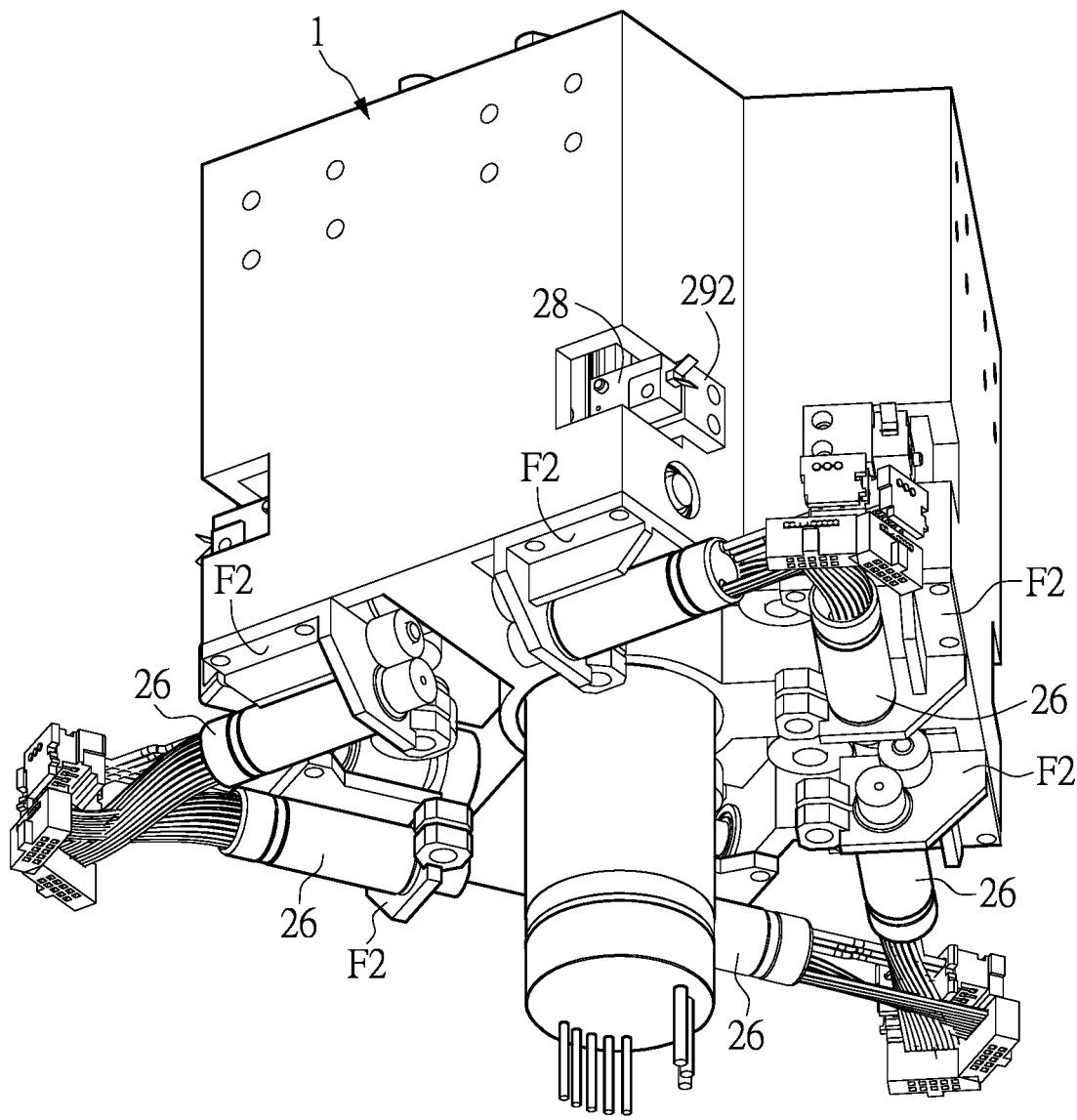
FIG. 2 schematically illustrates a second perspective view of the transmission device according to the present disclosure.
Figure 3:
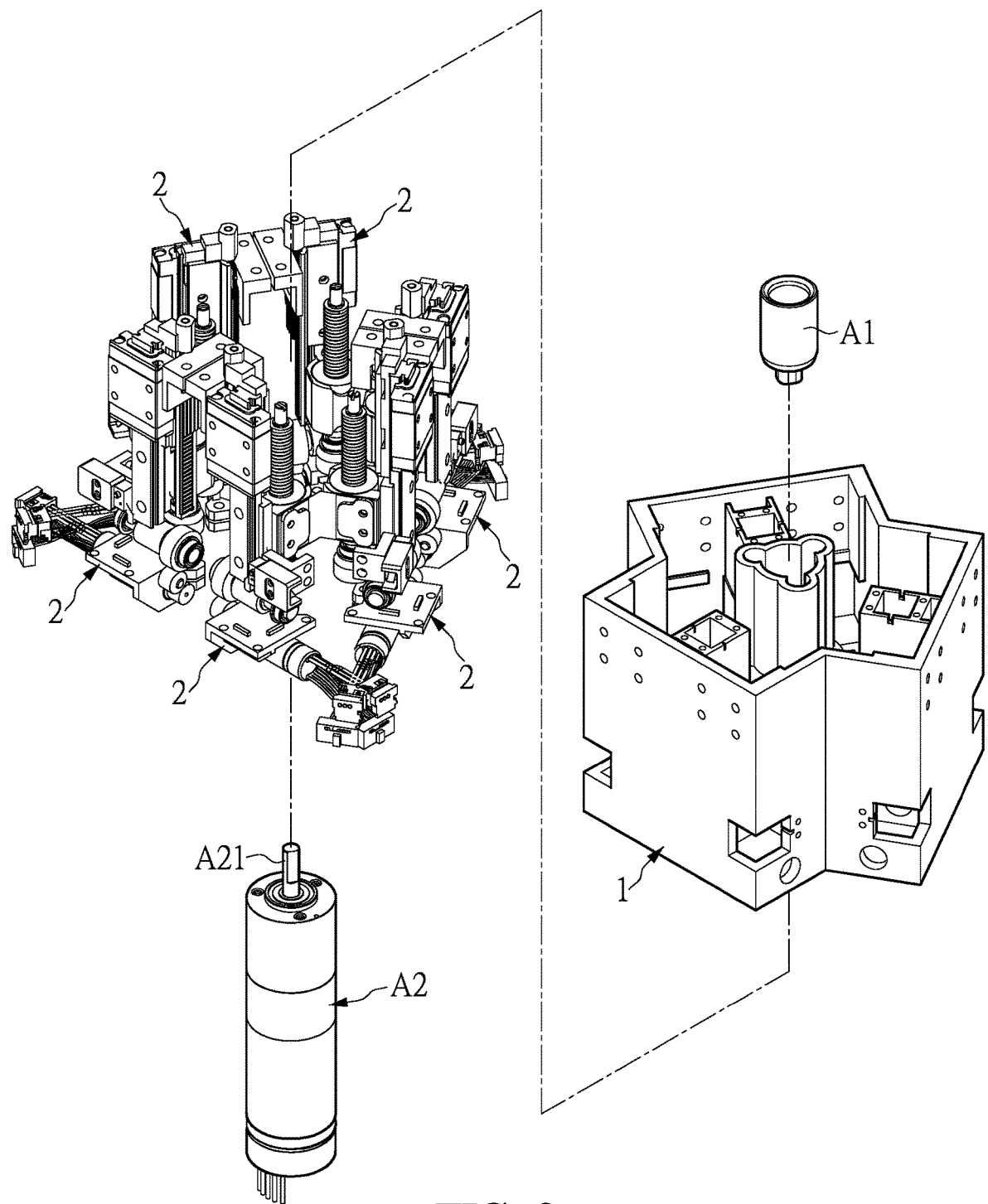
FIG. 3 schematically illustrates an exploded view of the transmission device according to the present disclosure.

Referring to FIG. 1 to FIG. 3, FIG. 1 schematically illustrates a first perspective view of a transmission device according to the present disclosure, FIG. 2 schematically illustrates a second perspective view of the transmission device according to the present disclosure, and FIG. 3 schematically illustrates an exploded view of the transmission device according to the present disclosure. The present disclosure provides a transmission device D. The transmission device D includes a base body 1 and a plurality of driving modules 2. The plurality of driving modules 2 are disposed in the base body 1, and each of the driving modules 2 operates independently.

Figure 4:
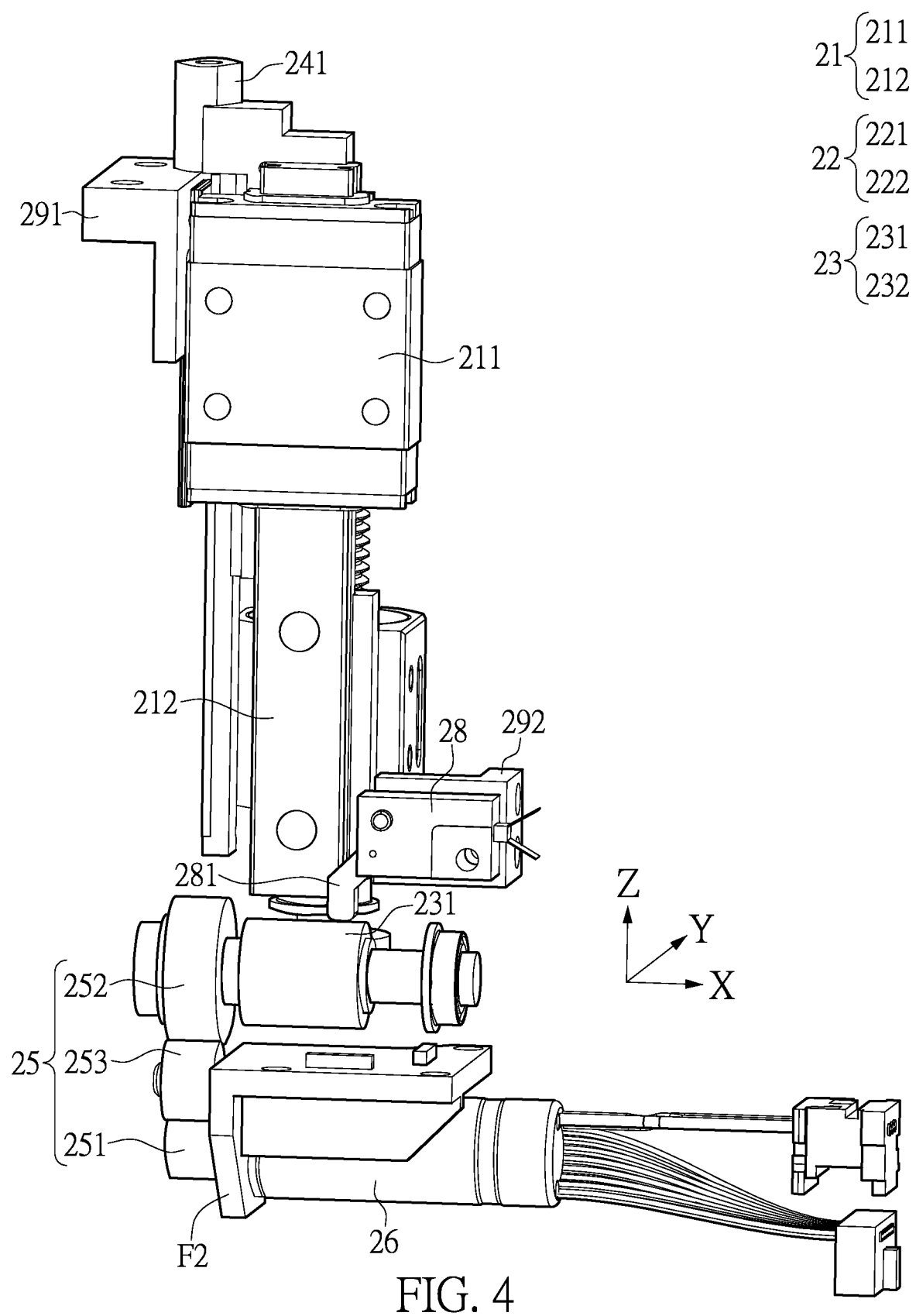
FIG. 4 schematically illustrates a first perspective view of a driving module according to the present disclosure.
Figure 5:
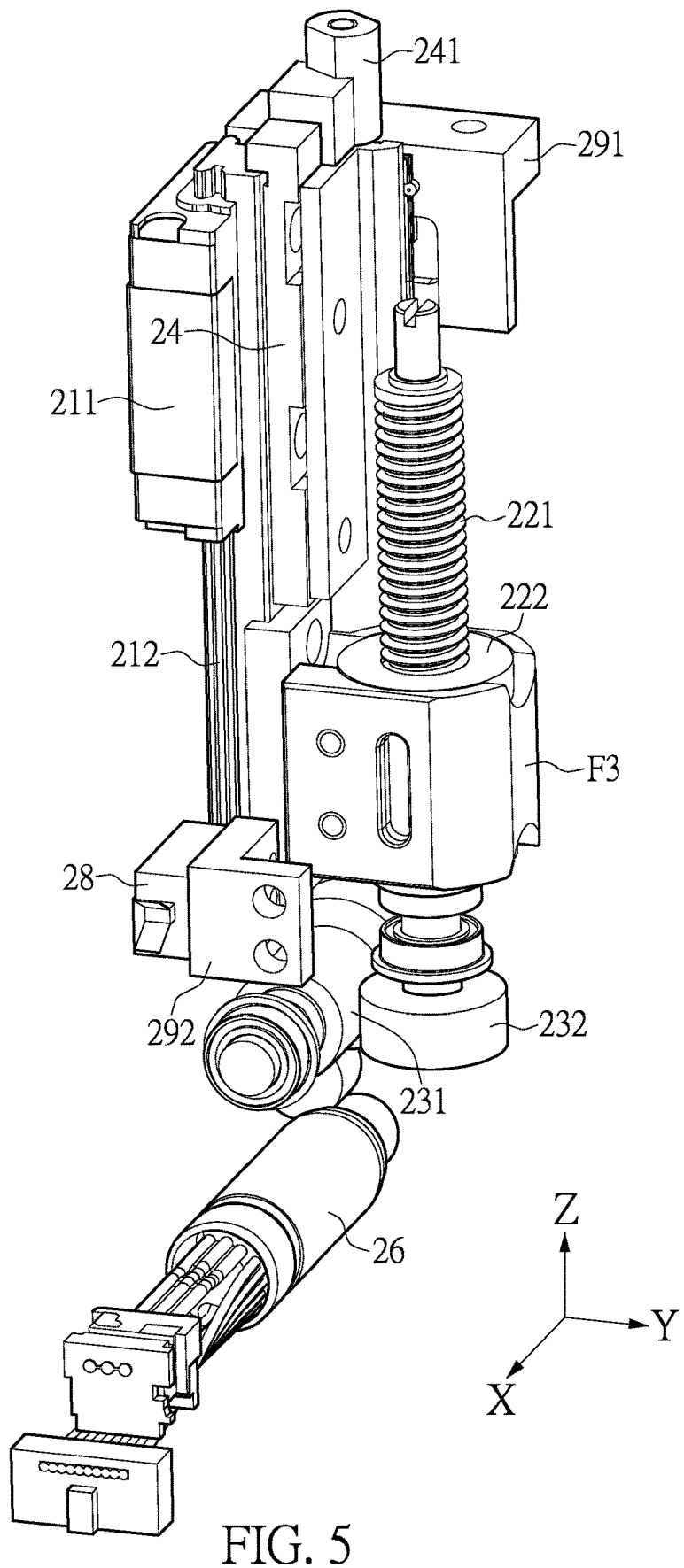
FIG. 5 schematically illustrates a second perspective view of the driving module according to the present disclosure.
Figure 6:
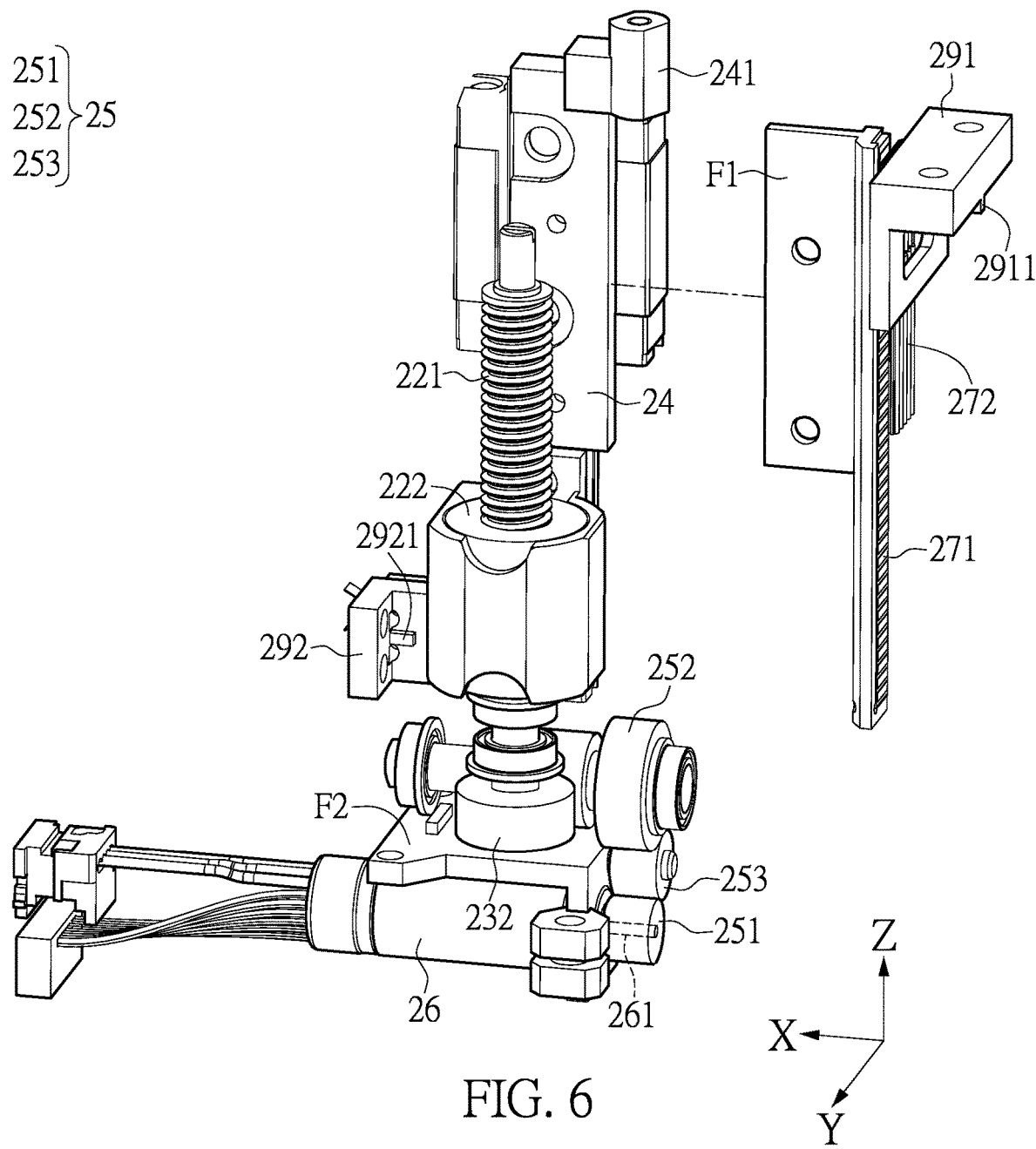
FIG. 6 partially illustrates an exploded view of the driving module according to the present disclosure.

Referring to FIG. 4 to FIG. 6, FIG. 4 schematically illustrates a first perspective view of a driving module according to the present disclosure, FIG. 5 schematically illustrates a second perspective view of the driving module according to the present disclosure, and FIG. 6 partially illustrates an exploded view of the driving module according to the present disclosure. Each of the driving modules 2 includes a first transmission set 21, a second transmission set 22, a third transmission set 23, a linking member 24, a gear set 25, and a driving motor 26.

The first transmission set 21 includes a slide block 211 and a slide rail 212. The slide block 211 is fixed on an inner surface of the base body 1, and the slide block 211 is movably disposed on the slide rail 212. Therefore, the slide rail 212 can reciprocate along a straight line parallel to a Z-axis relative to the slide block 211. The linking member 24 is fixed on the slide rail 212. The linking member 24 includes a slide shaft 241. Furthermore, the linking member 24 can be driven by the slide rail 212, such that the slide shaft 241 also reciprocates along the Z-axis direction.

The second transmission set 22 includes a screw rod 221 and a nut 222. The nut 222 is movably disposed on the screw rod 221, and the screw rod 221 is parallel to the Z-axis. As shown in FIG. 5, the nut 222 can be fixed on the slide rail 212 of the first transmission set 21 through a fixing member F3. Types of the fixing member F3 are not limited in the present disclosure. The third transmission set 23 includes a worm rod 231 and a worm gear 232 that mesh with each other. The worm gear 232 is connected to one end of the screw rod 221. Preferably, a lead angle defined between the worm rod 231 and the worm gear 232 is less than 4 degrees. Through the design of the lead angle being less than 4 degrees, the worm rod 231 and the worm gear 232 cooperate and have a self-locking function. That is, the worm rod 231 and the worm gear 232 can only rotate in a fixed rotation direction, such that power output by the driving motor 26 can be transmitted in a single direction. For example, the power output by the driving motor 26 is sequentially transmitted from the gear set 25 and the third transmission set 23 to the screw rod 221 of the second transmission set 22. However, when the driving motor 26 does not operate and the screw rod 221 attempts to rotate due to an external force, the worm rod 231 can lock the worm gear 232 in place and prevent the worm gear 232 from operating.

As shown in FIG. 4 and FIG. 6, the driving motor 26 includes a driving shaft 261. The gear set 25 is connected to the worm rod 231. The gear set 25 includes an active gear 251, a passive gear 252, and at least one intermediate gear 253. The driving shaft 261 extends along a first direction (i.e., the negative X-axis direction) and is connected with the active gear 251. The passive gear 252 is connected to the worm rod 231, and the at least one intermediate gear 253 is disposed between and mesh with the active gear 251 and the passive gear 252.

As shown in FIG. 5 and FIG. 6, the driving motor 26 is used to output power to drive the driving shaft 261, and the driving shaft 261 drives the gear set 25, the third transmission set 23, the second transmission set 22, and the first transmission set 21, such that the slide shaft 241 moves along a second direction (i.e., the positive Z-axis direction).

Specifically, the driving motor 26 outputs the power to drive and rotate the driving shaft 261, and the driving shaft 261 sequentially drives and rotates the active gear 251, the at least one intermediate gear 253, and the passive gear 252. Because the passive gear 252 is connected to the worm rod 231, and the worm gear 232 is connected to the screw rod 221, the passive gear 252 can drive the screw rod 221 of the second transmission set 22 through the worm rod 231 and the worm gear 232 of the third transmission set 23, so as to make the screw rod 221 spin. The nut 222 reciprocates along the screw rod 221 (parallel to the Z-axis) in response to spinning of the screw rod 221. Then, the nut 222 drives the slide rail 212 and the linking member 24 that is fixed on the slide rail 212, such that the slide shaft 241 of the linking member 24 reciprocates together with the nut 222.

The transmission device D of the present disclosure can be applied in a high-precision medical apparatus. As shown in FIG. 1, for example, the transmission device D of the present disclosure includes six driving modules 2. The six driving modules 2 can be connected to one end of multiple robotic arms (not shown in the figures) through six slide shafts 241, and then combine an end platform (not shown in the figures) that is connected to another end of the multiple robotic arms to form a synergistic motion platform that is also referred to as a Stewart platform. Such a parallel manipulator (i.e., the synergistic motion platform) can be configured to operate six mechanical rods to enable movement of the end platform having six degrees of freedom.

Figure 9:
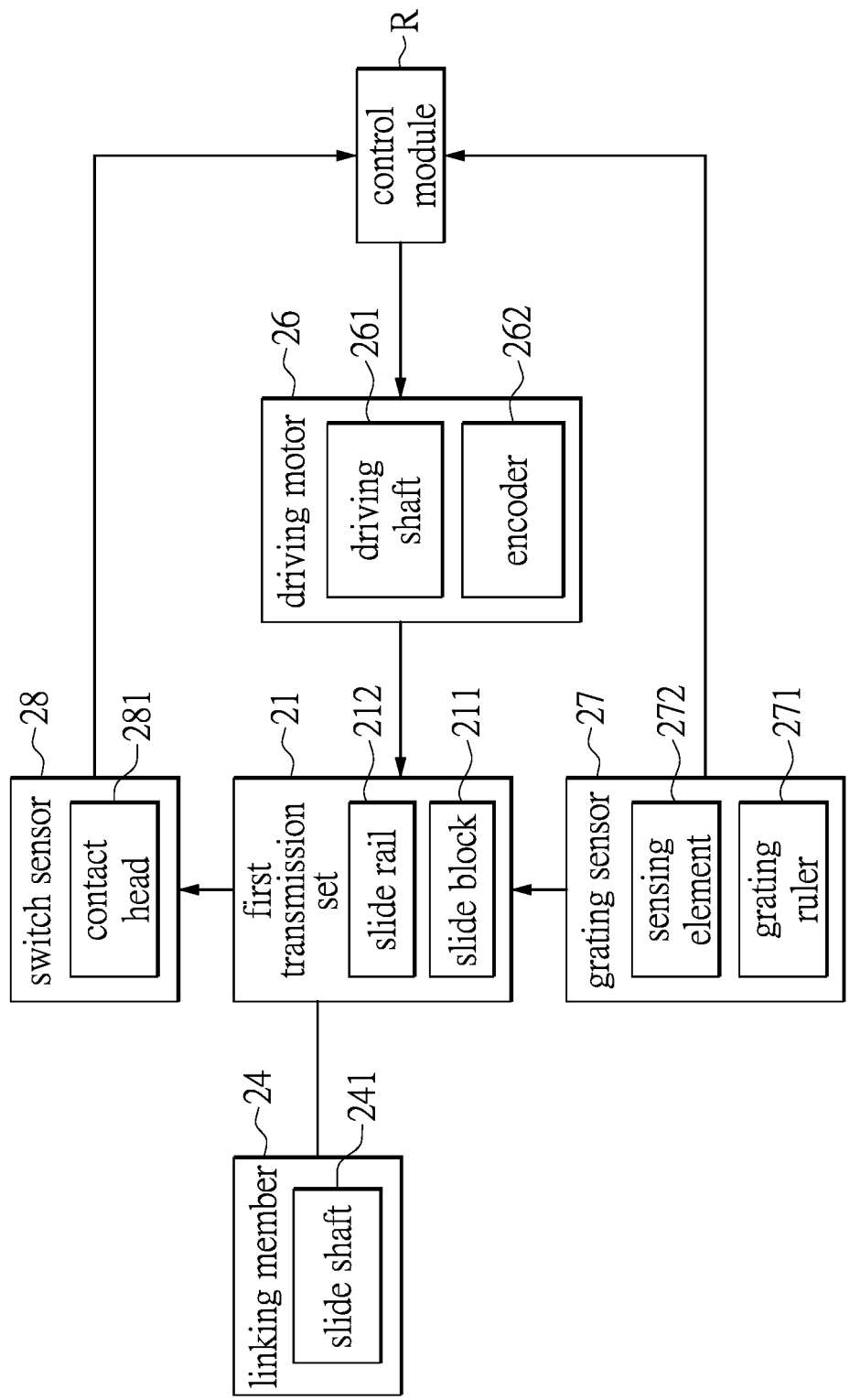
FIG. 9 is a functional block diagram of the transmission device according to the present disclosure.

Referring to FIG. 9, FIG. 9 is a functional block diagram of the transmission device according to the present disclosure. Each of the driving modules 2 further includes an encoder 262 that is electrically connected to the driving motor 26. Depending on a manner by which the encoder 262 generates a signal, the encoder 262 can be a contact encoder, an electromagnetic encoder, or an optical encoder. However, the present disclosure is not limited thereto. In the present disclosure, the encoder 262 is used to detect a rotational motion of the driving shaft 261. Since a displacement of the slide shaft 241 of the linking member 24 is caused by the power provided by the driving motor 26, the displacement of the slide shaft 241 can be calculated by measuring the rotation number of the driving motor 26.

Referring to FIG. 1, FIG. 6, and FIG. 9, each of the driving modules 2 further includes a grating sensor 27 and a fixing member F1. The grating sensor 27 is disposed on the fixing member F1, and the fixing member F1 is disposed on the linking member 24. The grating sensor 27 can be fixed on the linking member 24 through the fixing member F1. Moreover, the grating sensor 27 includes a grating ruler 271 and a sensing element 272. The grating ruler 271 is disposed on the fixing member F1. The sensing element 272 is connected to a first fixing bracket 291 of the driving module 2, and is fixed on the base body 1 through the first fixing bracket 291. When the slide rail 212 moves, the fixing member F1 and the grating ruler 271 fixed thereon are taken by the slide rail 212 (the sensing element 272 is still fixed on the base body 1) to move, such that the grating ruler 271 and the sensing element 272 move relative to each other.

Therefore, the sensing element 272 can be used to sense a movement of the grating ruler 271 and obtain the displacement amount of the slide rail 212. Because the linking member 24 is fixed on the slide rail 212, the displacement amount of the slide rail 212 is exactly the displacement amount of the slide shaft 241. In response to the displacement amount of the slide rail 212, the sensing element 272 sends a displacement signal to a control module R (as shown in FIG. 9). The control module R is an external component that is electrically connected to the driving motor 26, the encoder 262, and the grating sensor 27. For example, the control module R can be a microcontroller (MCU), but the present disclosure is not limited thereto. The control module R can output a control signal to the driving motor 26 in response to the displacement signal, such that the driving motor 26 drives the slide shaft 241 to perform displacement compensation.

Specifically, the displacement of the slide shaft 241, calculated based on the rotation number of the driving motor 26 measured by the encoder 262, is an estimated value. The power output by the driving motor 26 is transmitted to the slide rail 212 via the gear set 25. In the process of power transmission, the meshing clearances between gears of the gear set 25 (the active gear 251, the at least one intermediate gear 253, and the passive gear 252), the tolerances of various components in each of the driving modules 2, and the assembly clearance of the components during assembling will cause an actual displacement of the slide shaft 241 to be different from the estimated value that is obtained by the encoder 262. In comparison, since the grating sensor 27 straightforwardly measures the displacement amount of the slide rail 212, the displacement amount of the slide rail 212 that is detected by the grating sensor 27 will be closer to or even equal to the actual displacement of the slide shaft 241. Therefore, the control module R will obtain a displacement difference by comparing the displacements measured by the grating sensor 27 and the encoder 262. The displacement difference is caused by the meshing clearances of the gear set 25, the assembly clearance between the components, and the tolerances of the components. The control module R will output the control signal to the driving motor 26 based on the displacement difference and control the driving motor 26 to drive the slide shaft 241 to generate a compensation displacement.

As shown in FIG. 9, the grating sensor 27 and the encoder 262 can cooperate with each other to form a closed loop control system. Therefore, the control module R can compensate for the meshing clearances of the gear set 25, the assembly clearance between the components, and the tolerances of the components based on the displacement measured by the grating sensor 27, so as to achieve the purpose of the displacement compensation.

Referring to FIG. 2, FIG. 4, and FIG. 9, each of the driving modules 2 further includes a switch sensor 28. The switch sensor 28 is connected to a second fixing bracket 292 of the driving module 2, and is fixed on the base body 1 through the second fixing bracket 292 (as shown in FIG. 2). The switch sensor 28 includes a contact head 281, and the switch sensor 28 is electrically connected to the control module R. When the slide rail 212 moves relative to the slide block 211 along a third direction (i.e., a negative Z-axis direction) opposite to the second direction, one end of the slide rail 212 abuts against the contact head 281. Furthermore, when the slide rail 212 abuts against the contact head 281, the switch sensor 28 will output a notification signal to the control module R. By the above mechanism, the control module R can use a position where the slide rail 212 contacts the contact 281 as a reference point or a final position of the movement of the slide shaft 241. In conjunction with the displacements measured by the grating sensor 27 and motor encoder 262, the exact position of the slide shaft 241 after it has moved can be determined.

Figure 7:
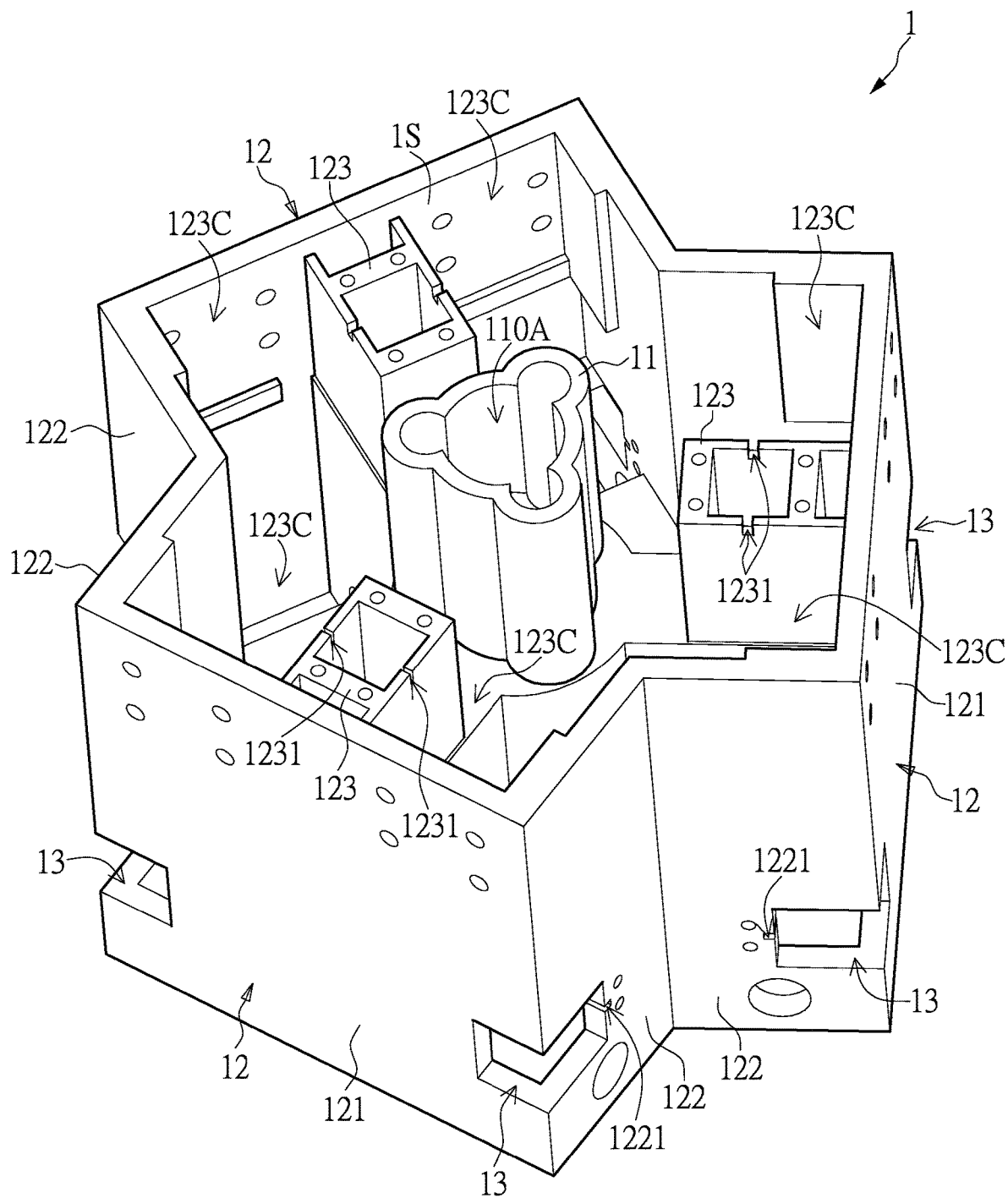
FIG. 7 schematically illustrates a first perspective view of a base body according to the present disclosure.
Figure 8:
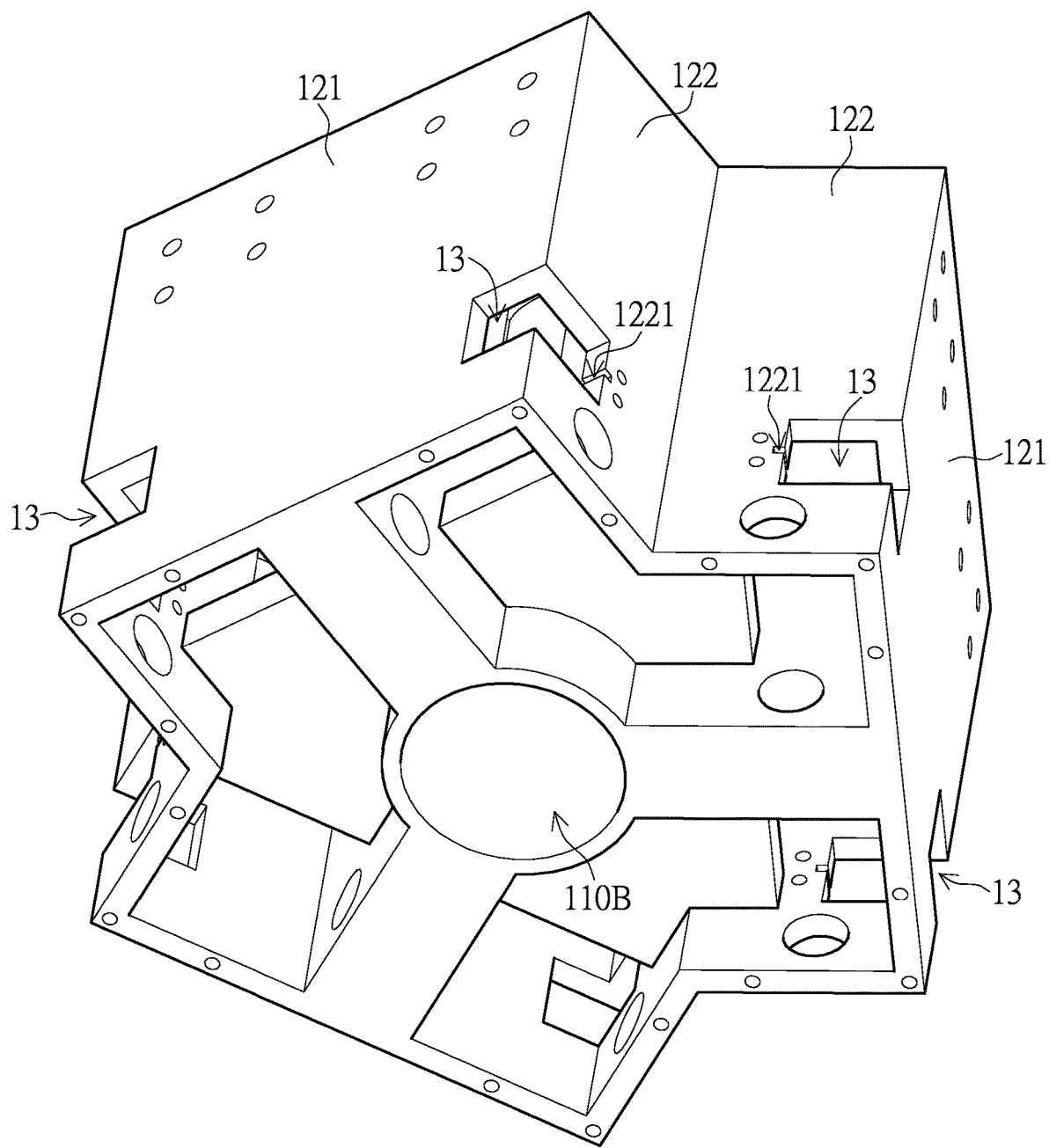
FIG. 8 schematically illustrates a second perspective view of the base body according to the present disclosure.

Referring to FIG. 7 and FIG. 8, FIG. 7 schematically illustrates a first perspective view of a base body according to the present disclosure, and FIG. 8 schematically illustrates a second perspective view of the base body according to the present disclosure. The base body 1 includes a shaft base portion 11 and three accommodating portions 12. The three accommodating portions 12 surround the shaft base portion 11. Each of the three accommodating portions 12 includes a first side wall 121 and two second side walls 122. The two second side walls 122 are respectively connected to two sides of the first side wall 121, and two openings 13 are respectively formed between the first side wall 121 and the two second side walls 122.

The shaft base portion 11 is a hollow casing, and a top and a bottom of the hollow casing each has a through hole. For example, the base body 1 can further interface with external components, as shown in FIGS. 1 to 3, and the external components can include, for example, a connecting sleeve A1 and a shaft member A2. The connecting sleeve A1 can be mounted on the shaft base portion 11 through a through hole 110A at the top of the shaft base portion 11 (as shown in FIG. 7), and the shaft member A2 can be mounted on the shaft base portion 11 through another through hole 110B at the bottom of the shaft base portion 11 (as shown in FIG. 8). When the connecting sleeve A1 and the shaft member A2 are both disposed on the shaft base portion 11, a connecting shaft A21 of the shaft member A2 can be connected to the connecting sleeve A1. It should be noted that the use of the connecting sleeve A1 and the shaft member A2 are not limited in the present disclosure. The connecting sleeve A1 and the shaft member A2 are only for illustrating that the base body 1 can connect external components through the shaft base portion 11 for appropriate applications.

Referring to FIG. 3 and FIG. 7, each of the accommodating portions 12 includes a partition wall 123. The partition wall 123 is disposed on an inner surface of the first side wall 121 and divides an interior of the accommodating portion 12 into two inner cavities 123C. In the present disclosure, the six driving modules 2 are respectively disposed in six inner cavities 123C of the three accommodating portions 12. In each of the driving modules 2, the slide block 211 of the first transmission set 21 is fixed on the corresponding first side wall 121, and the driving motor 26 and the gear set 25 can be fixed to a bottom of the base body 1 through a fixing member F2.

Referring to FIG. 1 and FIG. 7, in each of the driving modules 2, the sensing element 272 of the grating sensor 27 is connected to the first fixing bracket 291, and is fixed on the partition wall 123 through the first fixing bracket 291. The switch sensor 28 is disposed in one of the openings 13 of the base body 1. The switch sensor 28 is connected to the second fixing bracket 292, and is fixed on one of the second side walls 122 of the base body 1 through the second fixing bracket 292.

Referring to FIG. 6 and FIG. 7, the first fixing bracket 291 includes a first limiting portion 2911, and the partition wall 123 includes a second limiting portion 1231. The first fixing bracket 291 is fixed to the partition wall 123 through the first limiting portion 2911 which is connected to the second limiting portion 1231. The second fixing bracket 292 includes a third limiting portion 2921, and the second side wall 122 includes a fourth limiting portion 1221. The second fixing bracket 292 is fixed to the second side wall 122 through the third limiting portion 2921 which is connected to the fourth limiting portion 1221.

Therefore, the transmission device D of the present disclosure is composed of a single part by installing the plurality of driving modules 2 within the base body 1. The overall structural strength of the transmission device D can be improved because the base body 1 has stronger rigidity. In addition, the power transmission of the transmission device D is mainly performed by the gear set 25, and the way of assembling the gear set is relatively simple.

Beneficial Effects of the Embodiment

In conclusion, in the transmission device D provided by the present disclosure, through the arrangement of the first transmission set 21, the second transmission set 22, the third transmission set 23, and the gear set 25, the torque output by the driving motor 26 can be transmitted to the slide shaft 241. When the transmission device D is assembled, the driving motor 26, the transmission sets (i.e., the first transmission set 21, the second transmission set 22, and the third transmission set 23), and the slide shaft 241 do not need to be arranged on the same axis, which is a relatively simple way of assembly. The effect of assembly errors that result from assembling of the components can be reduced, thereby improving precision. In addition, the plurality of driving modules 2 are disposed in the base body 1, so as to enhance the overall rigidity of the transmission device D is thus enhanced, and the stability of the transmission device D during operation is improved.

In addition, the grating sensor 27 and the encoder 262 can cooperate to form a closed loop control system. Based on the displacement measured by the grating sensor 27, the control module R can output the control signal to the driving motor 26 and control the driving motor 26 to drive the slide shaft 241 for generating a compensation displacement, thereby compensating for the meshing clearances of the gear set 25, the assembly clearance between the components, and the tolerances of the components. Moreover, the control module R can use the position where the slide rail 212 contacts the contact 281 as the reference point or the final position of the movement of the slide shaft 241, and the reference point or the final position of the movement of the slide shaft 241. In conjunction with the displacements measured by grating sensor 27 and motor encoder 262, the exact position of slide shaft 241 after it has moved can be determined.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A transmission device, comprising:
    a base body; and
    a plurality of driving modules disposed in the base body, wherein each of the driving modules includes:
        a first transmission set including a slide rail and a slide block movably disposed on the slide rail, wherein the slide block is fixed on an inner surface of the base body, such that the slide rail reciprocates along a straight line relative to the slide block;
        a linking member fixed on the slide rail, wherein the linking member includes a slide shaft;
        a second transmission set including a screw rod and a nut movably disposed on the screw rod, wherein the nut is fixed on the slide rail;
        a third transmission set including a worm rod and a worm gear that mesh with each other, wherein the worm gear is connected to one end of the screw rod;
        a gear set connected to the worm rod; and
        a driving motor including a driving shaft, wherein the driving shaft is connected to the gear set, and the driving shaft extends along a first direction;
    wherein the driving motor is used to provide power to drive the driving shaft, the driving shaft drives the gear set, the third transmission set, the second transmission set, and the first transmission set, such that the slide shaft moves along a second direction which is perpendicular to the first direction.

2. The transmission device according to claim 1, wherein each of the driving modules further includes an encoder electrically connected to the driving motor, and the encoder is used for calculating a displacement of the slide shaft by measuring a rotation number of the driving motor.

3. The transmission device according to claim 2, wherein each of the driving modules further includes a grating sensor and a fixing member, the fixing member is disposed on the linking member, and the grating sensor is disposed on the fixing member.

4. The transmission device according to claim 3, wherein the grating sensor includes a grating ruler and a sensing element, the sensing element is fixed on the base body, and the grating ruler is disposed on the fixing member;
    wherein the fixing member is driven by the slide rail, such that the grating ruler and the sensing element move relative to each other.

5. The transmission device according to claim 4, wherein the sensing element outputs a displacement signal to a control module in response to movement of the grating ruler, and the control module outputs a control signal to the driving motor in response to the displacement signal, such that the driving motor drives the slide shaft to perform displacement compensation.

6. The transmission device according to claim 1, wherein each of the driving modules further includes a switch sensor fixed on the base body, and the switch sensor includes a contact head; wherein, when the slide rail moves relative to the slide block along a third direction opposite to the second direction, one end of the slide rail abuts against the contact head.

7. The transmission device according to claim 1, wherein a lead angle defined between the worm rod and the worm gear is less than 4 degrees.

8. The transmission device according to claim 1, wherein the gear set includes an active gear, a passive gear, and at least one intermediate gear, the passive gear is connected to the driving shaft, the passive gear is connected to the worm rod, and the at least one intermediate gear is disposed between and meshes with the active gear and the passive gear.

9. The transmission device according to claim 3, wherein the base body includes a shaft base portion and three accommodating portions, the three accommodating portions surround the shaft base portion, each of the accommodating portions includes a first side wall and two second side walls, the two second side walls are respectively connected to two sides of the first side wall, and two openings respectively form between the first side wall and the two second side walls.

10. The transmission device according to claim 9, wherein each of the accommodating portions includes a partition wall, and the partition wall is disposed on the first side wall and divides an interior of the accommodating portion into two inner cavities; wherein a quantity of the plurality of driving modules is six, the six driving modules are respectively disposed in the two inner cavities, and the slide block of each of the six driving modules is fixed on a corresponding one of the first side walls.

11. The transmission device according to claim 10, wherein each of the six driving modules further includes a first fixing bracket and a second fixing bracket, a sensing element of the grating sensor is connected to the first fixing bracket, and the sensing element is fixed on the partition wall through the first fixing bracket; wherein a switch sensor of each of the six driving modules is disposed in one of the openings, the switch sensor is connected to the second fixing bracket, and the switch sensor is fixed on one of the second side walls through the second fixing bracket.

12. The transmission device according to claim 11, wherein the first fixing bracket includes a first limiting portion, the partition wall includes a second limiting portion, and the first fixing bracket is fixed to the partition wall through the first limiting portion being connected to the second limiting portion; wherein the second fixing bracket includes a third limiting portion, the second side wall includes a fourth limiting portion, and the second fixing bracket is fixed to the second side wall through the third limiting portion being connected to the fourth limiting portion.

* * * * *